June 1, 1965  A. C. DAMAN  3,186,700
APPARATUS FOR PROMOTING LIQUID-GAS CONTACT
Filed March 8, 1963  3 Sheets-Sheet 1
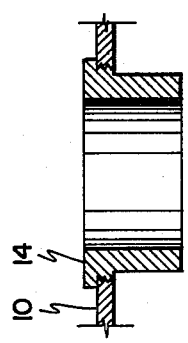
FIG. 3
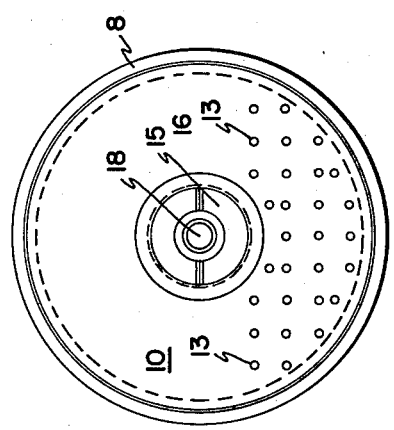
FIG. 2
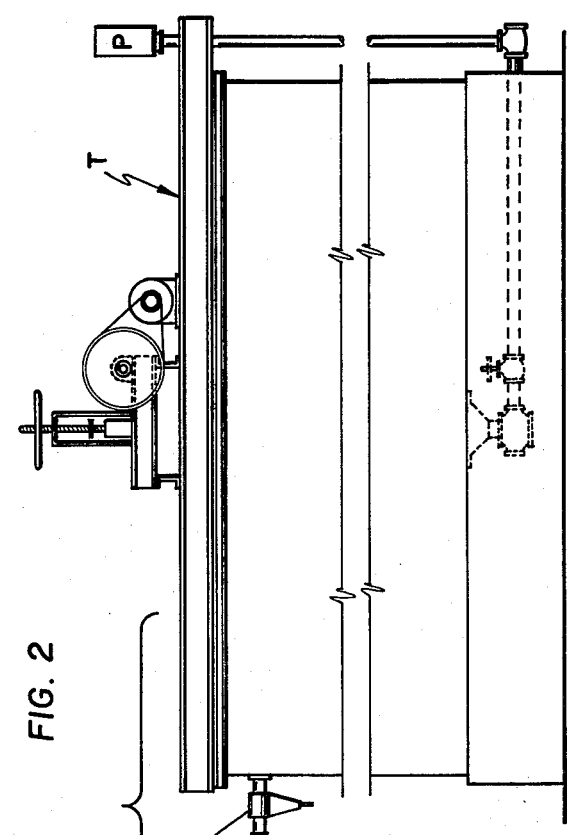
FIG. 1
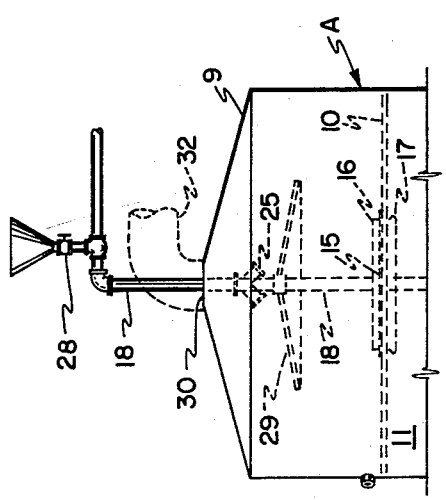
INVENTOR.
ARTHUR C. DAMAN
Attorneys INVENTOR.
BY ARTHUR C. DAMAN
Attorneys United States Patent Office 3,186,700
Patented June 1, 1965

3,186,700
APPARATUS FOR PROMOTING LIQUID-GAS CONTACT
Arthur C. Daman, Denver, Colo., assignor to Denver Equipment Company, Denver, Colo., a corporation of Colorado
Filed Mar. 8, 1963, Ser. No. 263,866
17 Claims. (Cl. 266—15)

This invention relates to apparatus for promoting liquid-gas contact and is particularly adapted for utilization in tower-like aerators in which gases are directed in countercurrent flow through streams of liquid in gravitational descent.

There is an increasing industrial requirement for aeration of liquids. In some instances, the aeration is required for changing the character of the liquid as by removal of constituents, altering its chemical composition or in changing the character or composition of the gas, particularly in removal of constituents of the gas. Examples of such treatments are the clarification or purification of waste waters including treatment of sewage plant effluent and industrial waste waters. In many industrial processes, chemical extractions are required in which constituents are extracted from the liquid into the gas flow under certain conditions and constituents of the gas are extracted into the liquid in others. As an example of the latter type of treatment, waste gases of processing operations and flue gas of ore roasting operations may be so treated for extraction and removal of noxious constituents from the gas flow prior to release to atmosphere.

Where the aeration treatment requires mixing of liquids and gases in countercurrent flows, the apparatus usually is in the form of a tower-like enclosure, the dimensions and capacity of which are designed for its intended use, thereby requiring special design and construction for each piece of equipment. Usually in such structures the treatment requires inspection or sampling at different stages of the treatment and frequently such inspection requires visual observation from outside the apparatus necessitating the inclusion of inspection openings and sampling ports in the design. Also, frequent maintenance and servicing interiorly of the unit will be required and this requires provision in the design for manholes or other access openings.

The present invention provides several innovations over prior practice. In its apparatus concept, standardized parts and components are used which are interchangeable permitting simple and easy replacement as required and also permitting the use of the same components in equipment of varying size. Another innovation resides in a controlled and regulated treatment time at each stage of the operation and particularly as to the gravitational flow of liquid so as to permit equipment of a given size to be operated under conditions of variable capacity and retention time.

Another novel feature of the structural arrangement is the provision for circulating the gas flow under conditions of natural draft, induced flow which may be either blower or suction type, and by heat input, all within the same apparatus assembly. Another innovation of the structural arrangement is the provision of specially formed passages within the apparatus which function during operation in the circulating control and which may be utilized as manholes in obtaining access to various areas within the enclosure.

Accordingly, it is an object of my invention to provide simple, durable and efficient apparatus of the tower type for countercurrent treatment of liquids and gases in a succession of stages with selective control of the gas-liquid contact and retention time at each stage of the treatment.

Another object of the invention is to provide a novel design and arrangement of components adapted to form a tower-type aerator in which the principal structural components are of standard dimension and designed for interfitting assembly, permitting extension of the length of the assembly as required to satisfy treatment specifications.

A further object of the invention is to provide a novel type of roaster and gas absorption tank utilizing interchangeable parts permitting easy replacement and repair while providing the requisite structural strength for such an assembly.

Yet another object of the invention is to provide gas-liquid contact apparatus providing multiple stage treatment in countercurrent flow with selective recycling of constituents of the treatment.

Other objects reside in novel details of construction and novel combinations and arrangements of parts, all of which will be set forth in detail in the course of the following description. The practice of my invention will be described with reference to the accompanying drawings in the several views of which like parts bear similar reference numerals. In the drawings, FIG. 1 is a fragmentary and somewhat schematic view in front elevation of one form of aerating apparatus embodying features of my invention operating in conjunction with a thickener;

FIG. 2 is a section taken along the line 2—2 of FIG. 1;

FIG. 3 is a fragmentary section through one of the liquid circulating openings of a deck member of the type shown in FIG. 2;

Figure 4:
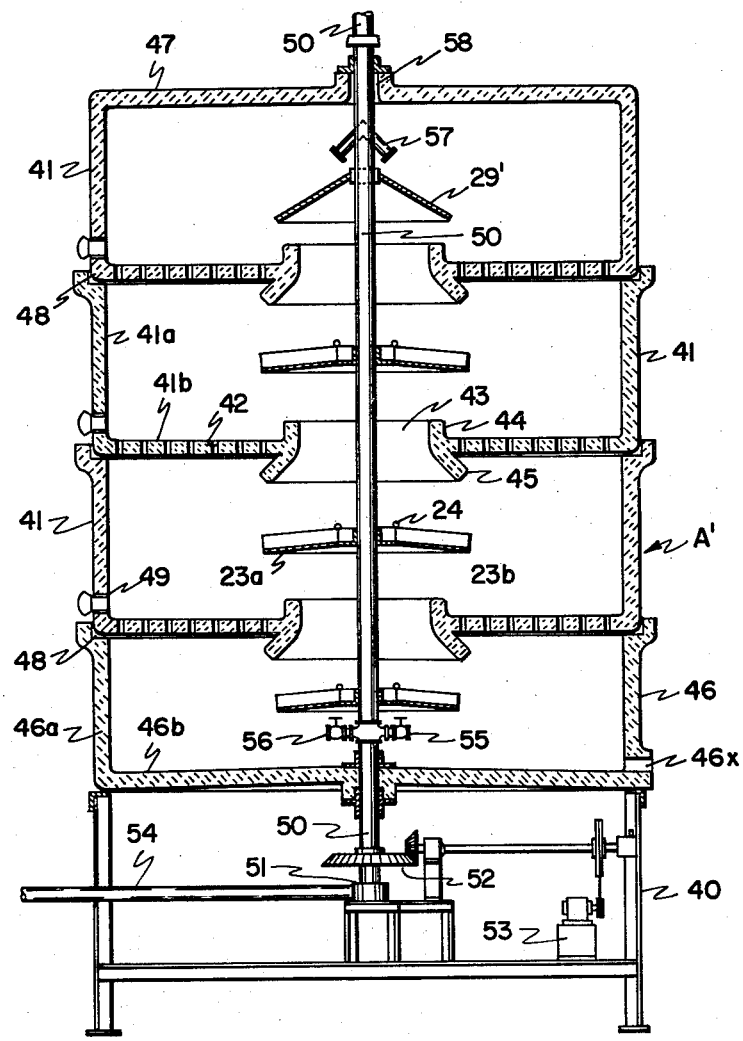
FIG. 4 is a vertical section through another aerator assembly utilizing interchangeable components and illustrating novel circulating features of my invention.

The embodiment of the aerator apparatus of my invention shown in FIG. 1 is represented as being in circuiting arrangement with a thickener apparatus as would be utilized in a treatment of sewage effluent, for example. The scale of the equipment depicted has been modified and varied for convenience in illustration. The aerator tank or tower A has been broken to indicate variable height and comprises an upright, elongated enclosure adapted to be mounted on a base-supporting structure (not shown). The thickener T also has been broken to indicate variable height and its supporting arrangement has been shown in FIG. 1

Aerator A comprises a tower-like housing including a conical bottom portion 7, a cylindrical intermediate portion 8, and a dome-like top enclosure 9. The interior of the tank is divided by a series of horizontal partitions or decks 10 into a plurality of treatment zones 11. Another horizontal partition 12 divides the conical bottom portion 7 from the lowermost zone 11 of the intermediate portion 8.

Each of the partitions 10 is of uniform dimension and comprises a disc-like body held in close-fitting relation to the walls of intermediate portion 8. A series of small diameter apertures 13 (FIG. 2) is distributed over the surface of body 10 and interchangeable bushings 14 (FIG. 3) are fitted in the apertures to provide a selective variation in the effective diameter of the passage. A central opening 15 is formed in each partition 10 defined by a rim 16 having a flared undersurface 17. The horizontal partition 12 has a similar central opening 15' and rim 16' but the flaring undersurface is omitted.

Figure 5:
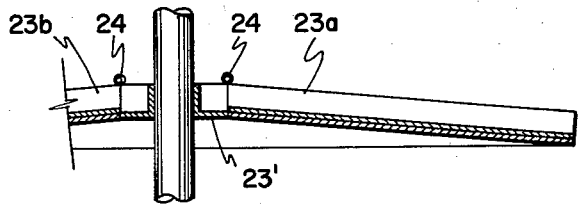
FIG. 5 is a fragmentary section through one of the baffle units of the type shown in FIG. 4.

A vertical conduit 18, preferably a rotary hollow shaft, extends downwardly through the top enclosure 9 and intermediate portion 8 along the center line of the apparatus and seats in a lower bearing 19 supported by a spider 20 secured on the undersurface of partition 12. The shaft 18 is driven by a motor and speed reducer assembly 21 and gearing 22. Baffle members 23 are mounted on the shaft beneath each central opening for rotation by the shaft. A preferred form of baffle is shown in FIG. 5 and comprises a hinged hub portion 23' and two slanting segmental portions 23a and 23b in hinged connection with the hub portion as indicated at 24. The portions 23a and 23b are imperforate and are held in edge abutting relation when in the down position shown in FIG. 5.

In the circuit of FIG. 1, sewage effluent comprising the overflow of thickener T is conducted through a fibrous trap unit 26 and delivered to the intake of a pump 27 in which it may be mixed with air or other aerating gas as the supply to vertical conduit 18. If desired, chemical additives may be introduced in the effluent supply through a valve-controlled branch 28. One or a plurality of rotary nozzles 25, here shown as two, are located near the top of conduit 18 and discharge the effluent outwardly in a rotary spray. Preferably, a conical baffle 29 is carried on conduit 18 below nozzles 25 to prevent any direct descent of the released effluent, and the baffle also functions to direct rising gases or vapor outwardly in the uppermost treatment zone before it can escape through a discharge port 30 in top portion 9.

The principal gas supply will be introduced into the lower portion of aerator A for elevating flow to the top discharge outlet or port 30. When natural draft conditions will supply the desired amount of aeration, an intake such as conduit 31 may be utilized. Where induced draft is utilized, the conduit may be connected with the discharge of a blower (not shown) or a conduit 32 fitted in port 30 may be connected to the intake side of an exhaust fan (not shown). Also, if desired, the passage through shaft 18 may be partitioned and other gas supplied through a line 33 which will discharge into the lower end of shaft 18 for release through valve controlled ports or nozzles 34 into any of the treatment zones 11, and shown in FIG. 1 as the lowermost zone. The final liquid of the treatment is collected in bottom portion 7 and discharges through a line 35. Optionally, some or all the gaseous discharge through conduit 32 may be recirculated through intake conduit 31 for a selected operating interval.

One of the innovations of the present invention is the provision for standardized components, particularly partitions and baffles, so that similar components can be installed in units of widely different height and capacity. In addition, the provision of the interchangeable bushings to vary the discharge capacity of the passages in the decks provides a control of liquid retention time in each treatment stage, and such changes may be made after a given installation has been operating and a determination is made of optimum retention time in such operation.

Gas circulation also may be controlled. If natural draft is utilized, variations in the valve setting controlling the inlet and outlet passages will accelerate or delay such circulation. If the circulation is by induced draft, changing the output capacity of the fan or blower will give the desired control of circulation. In addition, the introduction of gas into different treatment zones through the nozzles 34 provides an additional control on the rate and volume of circulating gas in selected treatment zones.

FIG. 4 illustrates another embodiment of my invention, particularly suited for the treatment of corrosive materials. In this form, the tank or tower A' has a base-supporting framework 40 on which a succession of upper sections 41 are seated on the next lower section including a bottom discharge section 46 and each of said sections defines a treatment zone within the tower. For convenience in production, it is preferable to form each section 41 as a two part assembly comprising an annular portion 41a and a disc-like bottom portion 41b having apertures 42 distributed over its surface and a central opening 43 formed by a rim portion 44 having a flaring lower surface 45. Section 46 as shown also is sectional and comprises an annular wall portion 46a having an outlet 46x, and a disc-like bottom 46b which is imperforate. An imperforate top closure 47 is seated on the uppermost section 41.

As shown in FIG. 4, the annular members 41a and 46a are of uniform diameter and flanged at their tops. Each flanged portion has a recess 48 providing a flat seat in which the bottom sections 41b and cover 47 are disposed. This arrangement permits formation of a tower of any desired height having a bottom section 46, a top cover 47 and one or any plurality of intermediate sections 41. The annular sections 41a have a normally plugged port 49 permitting sampling or visual inspection as required.

A central shaft 50, preferably hollow as shown, is seated in a lower bearing 51 and driven through a gearing assembly 52 by a motor and speed reducer unit 53. A conduit 54 has a conductive connection into the interior of shaft 50 through the interior of bearing assembly 51 for the supply of air or other gas under pressure, and nozzles 55 discharge gas into the treatment zones as determined by the setting of valves 56. Again, in this form it is preferable to have the passage in shaft 50 partitioned so as to permit liquid introduction through its top for discharge through spray heads 57. Sectional partitions 23a and 23b hinged at 24, as shown in FIG. 5, are mounted on shaft 50 below each central opening 43. Bushings (not shown) may be fitted in ports or apertures 42 to vary the effective size of the drain passages. The baffle 29' functions in the same manner as the baffle 29 of FIG. 1.

The operation of tower A' is essentially the same as tower A of FIG. 1, and is particularly suited for treatment of corrosive materials. When so used, the shaft, baffles, valves and nozzles will be formed of acid resistant material. In a treatment where flue gas is being treated to form an acid solution, for example, the liquid discharge through outlet 46x may be pumped back as feed to the sprays 57 to effect increase in concentration. The final gas exhaust through port 58 may discharge to atmosphere if sufficiently decontaminated, or otherwise it will be passed into a conduit for subsequent treatment. Such treatment may involve recirculation through line 54.

Figure 6:
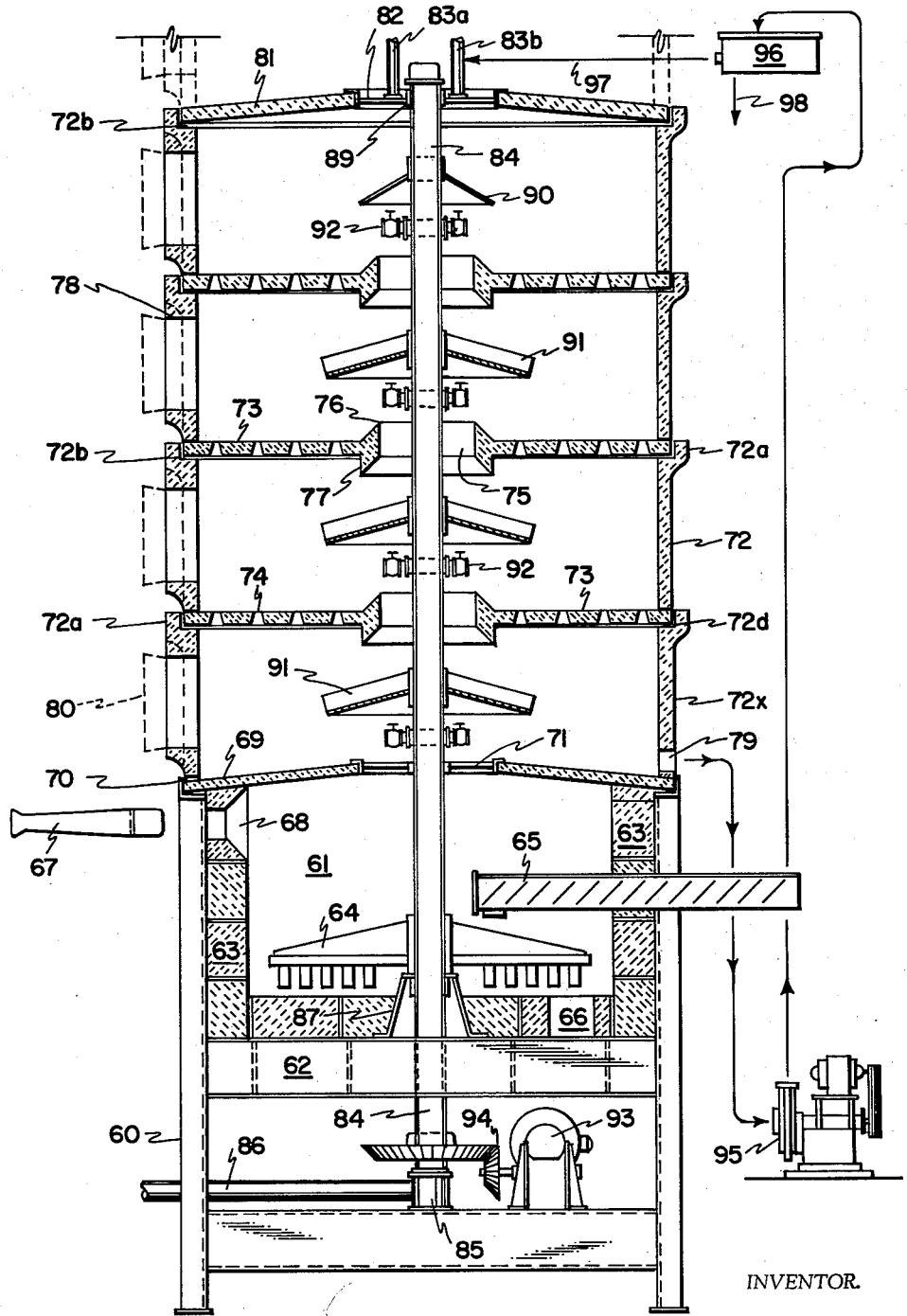
FIG. 6 is a vertical section of a combined roaster-gas absorption unit utilizing features of my invention and illustrated in conjunction with a recirculating system, the tank portion of which is shown out of scale to permit illustration of the remaining structure in larger scale.

FIG. 6 illustrates another assembly incorporated in a gas absorption system. In order to show the combined roaster-gas absorption tower in adequate scale, the pump and storage tank has been shown out of scale and location. In this form the tower forms an extension of a base-supporting framework 60 containing a roaster 61 having a bottom 62 and sides 63 formed of fire brick or other suitable lining. A rotary rabble 64 is disposed above and in proximity to bottom 62 and a conveyor or feed screw 65 delivers the ore charge onto an inclined surface of rabble 64. A discharge port 66 in bottom 63 conducts the slag from the roaster and a burner 67 discharges through an inlet 68 in wall 62.

The top of furnace 61 is enclosed by a dished ceramic member 69 seated in a channel 70 at the top of framework 60. Member 69 has its top surface inclining downwardly from a central opening 71 to the periphery to provide a drainage deck. In addition, member 69 provides the base support for the gas absorption tower of the assembly. A plurality of annular members 72 and a lowermost member 72x of uniform diameter form the wall of the tower. Each of said members has a top flanged portion 72a having an inner recess 72b providing a seat for the bottom section of the treatment zone next above. Disc-like bottom members 73 are fitted in the recess 72b and divide the treatment zones while the associated annular member seats on each bottom member 73.

Each member 73 has apertures or ports 74 distributed over its surface and a central opening 75 formed by a rim 76 having a flaring undersurface 77. A sampling port 78 is provided in each of the members 72 and 72x which are identical except for a drainage discharge outlet 79 at the bottom of member 72x. Ports 78 are normally closed by wooden plugs 80 and thus do not affect circulation within the tower.

The uppermost annular member 72 has a top or cover 81 fitted in its recessed portion 72b to form the top enclosure of the tower. Cover 81 has a central opening 82 for exhaust of gases from the tower and a plurality of conduits 83a and 83b providing liquid inlet sprays extend into central opening 82. A hollow shaft 84 is supported in a lower bearing assembly 85 which provides conductive communication with a line 86. Shaft 84 is shielded in roaster 61 by the supporting structure 87 of rabble 64 and receives additional support from a bearing 88 in central opening 71 and a bearing 89 in the top central opening 82.

A deflector 90 is located in the uppermost compartment beneath inlet sprays 83a and 83b and baffles 91 are located beneath each of the central openings 75. Valve controlled jets or nozzles 92 are located in each treatment zone, preferably in overhanging relation to the lower central opening 75 for mixing with and directing the gas flow ascending through the opening. Shaft 84 is driven by a motor-speed reducer assembly 93 by gearing 94.

In the circuiting shown in FIG. 6, the solution discharge through port 79 is delivered into the intake of a pump 95 which elevates it into an acid storage tank 96. A bypass line 97 circulates acid from tank 96 through spray inlet 83b, and a line 98 conducts acid from storage tank 96 to process when the desired acid concentration has been attained. No conduit system has been shown for the off-gas discharging through opening 82. If desired, it may be collected before release to atmosphere and a portion recirculated through line 86 into hollow shaft 84 for regulated discharge through jets 92.

In operation, an ore charge is fed into roaster 61 by the conveyor 65 and the burner 67 is ignited to discharge the fuel supporting combustion through port 68. The shaft is rotated by operation of motor speed reducer unit 93 and a gas is introduced into the rotary shaft 84 from line 86 connected with a suitable source of supply (not shown).

An acid solution from tank 96 is delivered through line 97 into the feed spray 83b and other solution such as water is introduced through the spray unit 83a. The evolved gases of the roasting operation pass upwardly through the central opening 71 and are caused to flow toward the wall of the chamber by the deflecting action of member 91. This flow may be directed and supplemented by discharge of supplemental gas, such as recirculated roaster gas, through outlets 92 which discharge assumes a centrifugal flow due to the rotation of shaft 84 and entrains the rising roaster gases in such flow. As the gas flow spirals outwardly, it seeks escape above deflector 91 by passage through the opening 75 at the top of the treatment zone. Liquid dripping through the openings 74 in the bottom portion 73 next above is entrained in the gaseous flow and heated to form a mist or vapor providing a large amount of liquid-to-gas contact.

This action is repeated in each treatment zone throughout the ascending course of flow of the gas or vapor and liquid droplets too heavy to be carried by the gas descend onto the bottom member 73 and drip through the opening 74 therein to effect a gravitational descent onto the bottom member 69 of the lowermost zone from which they flow through a port 79 to the intake of pump 95. This discharge flow is elevated by the pump into acid storage tank 96 and recycled as previously described until a desired concentration is attained in the solution in tank 96. At that time, the bypass line can be closed and the acid discharged to process through line 98.

Liquid of the treatment will be supplied through inlet 83a until sufficient return solution has accumulated in tank 96 to initiate the return flow through bypass line 97. The shaping of the passages 74 in the bottom members 73 permits the insertion of conical or tapered bushings from the undersurface until such members are tightly held in a friction fit.

If observation through the ports 78 discloses that a greater or lessor liquid retention time is required, bushings may be replaced to provide greater or lesser flow capacity in any treatment zone. Similarly, if more or less gas flow is required in a given treatment zone, the valves controlling the discharge through the nozzles 92 may be actuated to increase or decrease such flow. Some additional control of gas flow rate will result from the temperatures established in roaster 61, although usually such temperatures will be controlled to suit the requirements of the ore charge under treatment rather than to cause a variation in gas flow. Another control of the gas flow is by regulating the discharge through the outlet 82 when a conduit system is provided which is valved to establish a lesser or greater rate of discharge flow.

I claim:

1. Apparatus for promoting liquid-gas contact, comprising an upright, elongated container for confining separate flows of gas and liquid, means for introducing a liquid to be treated into a top portion of the container for gravitational descent therethrough, a rotary shaft disposed centrally of the container having a hollow portion for introducing an elevating flow of gas into a bottom portion of the container by centrifugal action during rotation of the shaft, partitioning means at vertically spaced intervals throughout the container dividing the interior into a succession of treatment zones, each partitioning means having a central opening defined by a rim portion having a flaring bottom surface, and having small apertures distributed over its surface for dripping deposited liquid in droplets into a lower treatment zone, baffle means mounted on the shaft under each central opening directing elevating gas flow outwardly in the treatment zone through descending liquid prior to passage of the rising gas through the associated central opening into the next treatment zone, and a sloping surface at the bottom of the container for collection and discharge of treated liquid from the container, there being a top opening in the container for discharge of treated gas.

2. Apparatus for promoting liquid-gas contact, comprising an upright, elongated container for confining separate flows of gas and liquid, a rotary shaft disposed centrally of the container having a hollow portion for introducing a liquid to be treated into a top portion of the container for gravitational descent therethrough and for introducing an elevating flow of gas into a bottom portion of the container, partitioning means at vertically spaced intervals throughout the container dividing the interior into a succession of treatment zones, each partitioning means having a central opening defined by a rim portion having a flaring bottom surface, and having small apertures distributed over its surface for dripping deposited liquid in droplets into a lower treatment zone, demountable bushings in said apertures for varying the restriction of the passage therethrough, a baffle means mounted on the shaft under each central opening directing elevating gas flow outwardly in the treatment zone through descending liquid prior to passage of the rising gas through the associated central opening into the next treatment zone, and a sloping surface at the bottom of the container for collection and discharge of liquid from the container, there being a top opening in the container for discharge of treated gas.

3. Apparatus for promoting liquid-gas contact, comprising an upright, elongated container for confining separate flows of gas and liquid, partitioning means at vertically spaced intervals throughout the container dividing the interior into a succession of treatment zones, each partitioning means having a central opening defined by a rim portion having a flaring bottom surface, and having small apertures distributed over its surface for dripping a deposited liquid in droplets into a lower treatment zone, a hollow rotary shaft extending through said central openings for introducing a liquid to be treated at a plurality of different elevations within the container for gravitational descent therethrough and for introducing an elevating flow of gas directed countercurrent to the liquid by centrifugal action during rotation of the shaft, baffle means mounted on the shaft under each central opening directing elevating gas flow outwardly in the treatment zone through descending liquid prior to passage of the rising gas through the associated central opening into the next treatment zone, and a sloping surface at the bottom of the container for collection and discharge of treated liquid from the container, there being a top opening in the container for discharge of treated gas.

4. Apparatus for promoting liquid-gas contact, comprising an upright, elongated container for confining separate flows of gas and liquid, means for introducing a liquid to be treated into a top portion of the container for gravitational descent therethrough, partitioning means at vertically spaced intervals throughout the container dividing the interior into a succession of treatment zones, each partitioning means having a central opening defined by a rim portion having a flaring bottom surface, and having small apertures distributed over its surface for dripping a deposited liquid in droplets into a lower treatment zone, a hollow rotary shaft extending through said central openings for inducing at a plurality of different elevations an elevating flow of gas directed countercurrent to a liquid by centrifugal action during rotation of the shaft, baffle means mounted on the shaft under each central opening directing elevating gas flow outwardly in the treatment zone through descending liquid prior to passage of the rising gas through the associated central opening into the next treatment zone, and a sloping surface at the bottom of the container for collection and discharge of treated liquid from the container, there being a top opening in the container for discharge of treated gas.

5. Apparatus for promoting liquid-gas contact, comprising an upright, elongated container for confining separate flows of gas and liquid, a rotary shaft disposed centrally of the container having a hollow portion for introducing a liquid to be treated into a top portion of the container for gravitational descent therethrough, means for introducing a flow of heated gas upwardly through the bottom porton of the container by centrifugal action during rotation of the shaft, partitioning means fully traversing the container at vertically spaced intervals throughout the container dividing the interior into a succession of treatment zones, each partitioning means having a central opening defined by a rim portion having a flaring bottom surface, and having small apertures distributed over its entire transverse surface for dripping deposited liquid in droplets into a lower treatment zone, baffle means mounted on the shaft under each central opening directing elevating gas flow outwardly in the treatment zone through descending liquid prior to passage of the rising gas through the associated central opening into the next treatment zone, and a sloping surface at the bottom of the container for collection and discharge of treated liquid from the container, there being a top opening in the container for discharge of treated gas.

6. Apparatus for promoting liquid-gas contact, comprising an upright, elongated container for confining separate flows of gas and liquid, means for introducing a liquid to be treated into a top portion of the container for gravitational descent therethrough, partitioning means at vertically spaced intervals throughout the container dividing the interior into a succession of treatment zones, each partitioning means having a central opening defined by a rim portion having a flaring bottom surface, and having small apertures distributed over its surface for dripping deposited liquid in droplets into a lower treatment zone, a hollow rotary shaft extending through said central openings having valve controlled means for introducing gas into each treatment zone by centrifugal action during rotation of the shaft baffle means mounted on the shaft under each central opening directing elevating gas flow outwardly in the treatment zone through descending liquid prior to passage of the rising gas through the associated central opening into the next treatment zone, and a sloping surface at the bottom of the container for collection and discharge of treated liquid from the container, there being a top opening in the container for discharge of treated gas.

7. In apparatus for promoting liquid-gas contact, a tower enclosure for countercurrent treatment of liquid and gas in a plurality of treatment zones comprising a base portion adapted to be secured on a rigid support and having upstanding sides flanged at the top to provide a circumferential seat, a plurality of corresponding wall sections forming the intermediate portion of the enclosure, each said section including a cylindrical wall portion flanged at the top to provide a seat for an apertured partition, a partition in each said seat having a central opening defined by a rim portion having a flaring bottom portion and having apertures distributed over its surface for dripping liquid into a lower zone, an imperforate inverted dished partition seated on the top of the base portion and having a central opening for the passage of circulating gas upwardly into the lowermost treatment zone, the lowermost wall section being seated on the imperforate partition and each upper wall section being seated in the flanged top of the next lower section, baffle means under each central opening in the apertured partition directing elevating gas flow upwardly in the treatment zone through descending liquid prior to its passage through the associated central opening into the next treatment zone, an imperforate cover seated in the flanged portion of the uppermost wall portion having a central opening for discharge of gas rising from the uppermost treatment zone, and conduit means for introducing liquid to be treated through the central opening into the uppermost treatment zone, and there being an opening through the wall of the lowermost section adjoining the imperforate partition for discharge of treated liquid.

8. Apparatus for promoting liquid-gas contact, comprising an upright, elongated container for confining separate flows of gas and liquid, a rotary shaft disposed centrally of the container having a hollow portion for introducing a liquid to be treated into a top portion of the container for gravitational descent therethrough and for introducing an elevating flow of gas into a bottom portion of the container by centrifugal action during rotation of the shaft, partitioning means at vertically spaced intervals throughout the container dividing the interior into a succession of treatment zones, each partitioning means having a central opening defined by a rim portion having a flaring bottom surface, and having a percolating surface for discharge of deposited liquid into a lower treatment zone, baffle means mounted on the shaft under each central opening directing elevating gas flow outwardly in the treatment zone through descending liquid prior to passage of the rising gas through the associated central opening into the next treatment zone, and a sloping surface at the bottom of the container for collection and discharge of treated liquid from the container, there being a top opening in the container for discharge of treated gas.

9. Apparatus for promoting liquid-gas contact, comprising in combination a lower roaster for ores mounted on a fixed support, a top closure for the roaster having a central opening for exhaust of heated gases and an inverted dished surface outwardly of the central opening, an elongated container seated on the top of the roaster for confining separate flows of gas and liquid, means for introducing a liquid to be treated into a top portion of the container for gravitational descent therethrough, partitioning means at vertically spaced intervals through the container dividing its interior into a succession of treatment zones, each partitioning means having a central opening defined by a rim portion having a flaring bottom surface, and having small apertures distributed over its surface for dripping deposited liquid in droplets into a lower treatment zone, a rotary shaft extending through said central openings baffle means mounted on the shaft under each central opening directing heated roaster gases outwardly in the treatment zone through descending liquid prior to passage of the rising gas through the associated central opening into the next treatment zone, there being a top opening in the container for discharge of treated gas and a bottom outlet at the periphery of the dished closure of the roaster for discharge of treated liquid from the container, and means for discharging spent ore from the roaster.

10. Apparatus for promoting liquid-gas contact, comprising in combination a lower roaster for ores mounted on a fixed support, a top closure for the roaster having a central opening for exhaust of heated gases and inverted dished surface outwardly of the central opening, an elongated container seated on the top of the roaster for confining separate flows of gas and liquid, means for introducing a liquid to be treated into a top portion of the container for gravitational descent therethrough, partitioning means at vertically spaced intervals through the container dividing its interior into a succession of treatment zones, each partitioning means having a central opening defined by a rim portion having a flaring bottom surface, and having small apertures distributed over its surface for dripping deposited liquid in droplets into a lower treatment zone, a rotary hollow shaft extending through said central openings and having at least one outlet in a treatment zone for discharge of a heated gas by centrifugal action during rotation of the shaft baffle means mounted on the shaft under each central opening directing heated roaster gases outwardly in the treatment zone through descending liquid prior to passage of the rising gas through the associated central opening into the next treatment zone, rabbling means on the shaft for acting on the ore charge in the roaster, means for delivering heated gas into the lower portion of said hollow shaft, there being a top opening in the container for discharge of treated gas and a bottom outlet at the periphery of the dished closure of the roaster for discharge of treated liquid from the container, and means for discharging spent ore from the roaster.

11. Apparatus for promoting liquid-gas contact, comprising in combination a lower roaster for ores mounted on a fixed support, a top closure for the roaster having a central opening for exhaust of heated gases and an inverted dished surface outwardly of the central opening, an elongated container seated on the top of the roaster for confining separate flows of gas and liquid, means for introducing a liquid to be treated into a top portion of the container for gravitational descent therethrough, partitioning means at vertically spaced intervals through the container dividing its interior into a succession of treatment zones, each partitioning means having a central opening defined by a rim portion having a flaring bottom surface, and having small apertures distributed over its surface for dripping deposited liquid in droplets into a lower treatment zone, a rotary hollow shaft extending upwardly through said central openings and having valve-controlled outlets in each treatment zone for discharge of a heated gas by centrifugal action during rotation of the shaft, baffle means mounted on the shaft under each central opening directing heated roaster gases outwardly in the treatment zone through descending liquid prior to passage of the rising gas through the associated central opening into the next treatment zone, rabbling means on the shaft for acting on the ore charge in the roaster, means for delivering heated gas into the lower portion of said hollow shaft, there being a top opening in the container for discharge of treated gas and a bottom outlet at the periphery of the dished closure of the roaster for discharge of treated liquid from the container, and means for discharging spent ore from the roaster.

12. Apparatus for promoting liquid-gas contact, comprising in combination a lower roaster for ores mounted on a fixed support, a top closure for the roaster having a central opening for exhaust of heated gases and an inverted dished surface outwardly of the central opening, an elongated container seated on the top of the roaster for confining separate flows of gas and liquid, means for introducing a liquid to be treated into a top portion of the container for gravitational descent therethrough, partitioning means fully traversing the container at vertically spaced intervals through the container dividing its interior into a succession of treatment zones, each partitioning means having a central opening defined by a rim portion having a flaring bottom surface, and having percolating passages distributed over its entire transverse surface for conducting deposited liquid in droplets into a lower treatment zone, a rotary shaft extending through said central openings baffle means mounted on the shaft under each central opening directing heated roaster gases outwardly in the treatment zone through descending liquid prior to passage of the rising gas through the associated central opening into the next treatment zone, there being a top opening in the container for discharge of treated gas and a bottom outlet at the periphery of the dished closure of the roaster for discharge of treated liquid from the container, and means for discharging spent ore from the roaster.

13. Apparatus for promoting liquid-gas contact, comprising in combination a lower roaster for ores mounted on a fixed support, a top closure for the roaster having a central opening for exhaust of heated gases and an inverted dished surface outwardly of the central opening, an elongated container seated on the top of the roaster for confining separate flows of gas and liquid, means for introducing a liquid to be treated into a top portion of the container for gravitational descent therethrough, partitioning means at vertically spaced intervals through the container dividing its interior into a succession of treatment zones, each partitioning means having a central opening defined by a rim portion having a flaring bottom surface, and having small apertures distributed over its surface for dripping deposited liquid in droplets into a lower treatment zone, a rotary shaft extending through said central openings baffle means mounted on the shaft under each central opening directing heated roaster gases outwardly in the treatment zone through descending liquid prior to passage of the rising gas through the associated central opening into the next treatment zone, there being a top opening in the container for discharge of treated gas and a bottom outlet at the periphery of the dished closure of the roaster for discharge of treated liquid from the container, means for recirculating liquid discharging from the treatment through the liquid introduction means at the top of the container, and means for discharging spent ore from the roaster.

14. In apparatus for promoting liquid-gas contact, a tower enclosure for countercurrent treatment of liquid and gas in a plurality of treatment zones comprising a base portion adapted to be secured on a rigid support and having upstanding sides flanged at the top to provide a circumferential seat, a plurality of corresponding wall sections forming the intermediate portion of the enclosure, each said section including a cylindrical wall portion flanged at the top to provide a seat for an apertured partition, a partition in each said seat having a central opening defined by a rim portion having a flaring bottom portion and having apertures distributed over its surface for dripping liquid into a lower zone, an imperforate inverted dished partition seated on the top of the base portion and having a central opening for the passage of circulating gas upwardly into the lowermost treatment zone, the lowermost wall section being seated on the imperforate partition and each upper wall section being seated in the flanged top of the next lower section, an imperforate cover seated in the flanged portion of the uppermost wall portion having a central opening for discharge of gas rising from the uppermost treatment zone, means for introducing liquid to be treated through the central opening into the uppermost treatment zone, a rotary shaft disposed centrally of the container having a hollow portion for introducing an elevating flow of gas into the lowermost treatment zone by centrifugal action during rotation of the shaft, baffle means mounted on the shaft under each central opening in the apertured partition directing elevating gas flow outwardly in the treatment zone through descending liquid prior to its passage through the associated central opening into the next treatment zone, and there being an opening through the wall of the lowermost section adjoining the imperforate partition for discharge of treated liquid.

15. Apparatus for promoting liquid-gas contact, comprising an upright, elongated container for confining separate flows of gas and liquid, means for introducing a liquid to be treated into a top portion of the container for gravitational descent therethrough, a shaft disposed centrally of the container having a hollow portion for introducing an elevating flow of gas into a bottom portion of the container, partitioning means at vertically spaced intervals throughout the container dividing the interior into a succession of treatment zones, each partitioning means having a central opening defined by a rim portion having a flaring bottom surface, and having small apertures distributed over its surface for dripping deposited liquid in droplets into a lower treatment zone, baffle means mounted on the shaft under each central opening directing elevating gas flow outwardly in the treatment zone through descending liquid prior to passage of the rising gas through the associated central opening into the next treatment zone, and a sloping surface at the bottom of the container for collection and discharge of treated liquid from the container, there being a top opening in the container for discharge of treated gas.

16. Apparatus for promoting liquid-gas contact, comprising an upright, elongated container for confining separate flows of gas and liquid, means for introducing a liquid to be treated into a top portion of the container for gravitational descent therethrough, a rotary shaft disposed centrally of the container having a hollow portion for introducing an elevating flow of gas into a bottom portion of the container by centrifugal action during rotation of the shaft, partitioning means at vertically spaced intervals throughout the container dividing the interior into a succession of treatment zones, each partitioning means having a central opening defined by a rim portion having a flaring bottom surface, and having small apertures distributed over its surface for dripping deposited liquid in droplets into a lower treatment zone, a baffle under each central opening, each baffle having a hub portion mounted on the shaft and a sloping portion in hinged connection with the hubbed portion for directing elevating gas flow outwardly in the treatment zone through descending liquid prior to passage of the rising gas through the associated central opening into the next treatment zone, and a sloping surface at the bottom of the container for collection and discharge of treated liquid from the container, there being a top opening in the container for discharge of treated gas.

17. Apparatus for promoting liquid-gas contact, comprising in combination a lower roaster for ores mounted on a fixed support, an elongated container seated on the top of the roaster for confining separate flows of gas and liquid in a plurality of treatment zones, said container having a base portion adapted to be secured on the fixed support and having upstanding sides flanged at the top to provide a circumferential seat, a plurality of corresponding wall sections forming the intermediate portion of the container, each said section including a cylindrical wall portion flanged at the top to provide a seat for an apertured partition, a partition in each said seat having a central opening defined by a rim portion having a flaring bottom portion and having apertures distributed over its surface for dripping liquid into a lower zone, the base portion including an imperforate inverted dished partition forming a top closure for the roaster and having a central opening for exhaust of heated gases into the lowermost treatment zone, the lowermost wall section being seated on the imperforate partition and each upper wall section being seated in the flanged top of the next lower section, an imperforate cover seated in the flanged portions of the uppermost wall portion having a central opening for discharge of gas rising from the uppermost treatment zone, means for introducing liquid to be treated through the central opening into the uppermost treatment zone, a rotary shaft extending through said central openings, baffle means mounted on the shaft under each central opening in the apertured partition directing elevating gas flow outwardly in the treatment zone through descending liquid prior to its passage through the associated central opening into the next treatment zone, and there being an opening through the wall of the lowermost section adjoining the imperforate partition for discharge of treated liquid.

References Cited by the Examiner
UNITED STATES PATENTS

| | | | |
|---|---|---|---|
| 1,123,232 | 1/15 | Brassert et al. | 261—113 X |
| 2,924,441 | 2/60 | Osborne | 261—113 |
| 3,075,752 | 1/63 | Leva | 261—113 |

MORRIS O. WOLK, *Primary Examiner.*

JAMES H. TAYMAN, JR., *Examiner.*